Dec. 26, 1939.   J. MANTELET   2,184,719
MILL FOR GRINDING PEPPER, SALT, SUGAR, COFFEE AND THE LIKE
Filed July 23, 1937   3 Sheets-Sheet 1

Inventor:
Jean MANTELET
by C. A. Snow & Co.
Attorneys.

Dec. 26, 1939.                J. MANTELET                2,184,719
          MILL FOR GRINDING PEPPER, SALT, SUGAR, COFFEE AND THE LIKE
                    Filed July 23, 1937         3 Sheets-Sheet 2

Inventor:
Jean MANTELET
by CASnow&Co.
Attorneys.

Dec. 26, 1939.  J. MANTELET  2,184,719
MILL FOR GRINDING PEPPER, SALT, SUGAR, COFFEE AND THE LIKE
Filed July 23, 1937  3 Sheets-Sheet 3

Inventor
Jean MANTELET
by CASnow&Co.
Attorneys.

Patented Dec. 26, 1939

2,184,719

UNITED STATES PATENT OFFICE 2,184,719

MILL FOR GRINDING PEPPER, SALT, SUGAR, COFFEE AND THE LIKE

Jean Mantelet, Bagnolet, France, assignor to Mantelet & Boucher (Societe en nom collectif), Bagnolet (Seine), France Application July 23, 1937, Serial No. 155,314
In Luxemburg August 18, 1936

3 Claims. (Cl. 83—13)

My invention relates to mills for grinding pepper, salt, sugar, coffee and the like.

According to the present invention, my mill comprises a receptacle adapted to contain the matter to be ground, said receptacle including a stationary crushing portion integral therewith and a cover closing the opening of said receptacle and rotatably mounted relatively to said receptacle, said cover acting both as a cooperating crushing member securing the parcellation of the matter to be subdivided and a delivery member for the powdered matter.

Some embodiments of my invention are represented by way of examples in the accompanying drawings in which.

Figure 1:
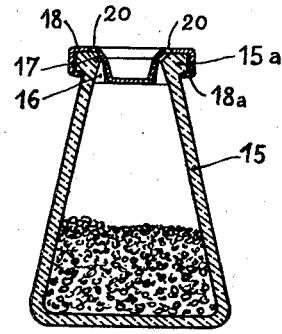
Fig. 1 shows in axial section a mill according to the invention.
Figure 2:
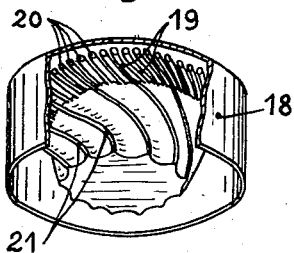
Figs. 2 and 3 are perspective views, partly broken, showing respectively the cover or lid and the upper part of the receptacle of said mill.
Figure 3:
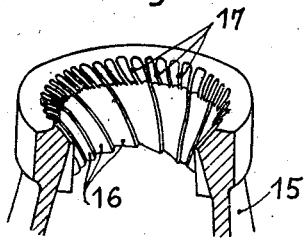

The mill shown in Fig. 1 is constituted by a receptacle 15 the upper part of which is provided with teeth 16 (Fig. 3) extending into teeth 17 which are disposed very closely the one to the other; the cover 18 (Fig. 2), the edge 18a of which suitably engages the upper edge 15a of the receptacle, forms a ring 19 the closely spaced teeth of which form with the teeth 17 of the receptacle small exhaust channels opening into the holes 20 of the cover. Teeth 21, which are more remote the one from the other, are adapted to receive the particles of matter to be crushed which are ground by the teeth 16 of the receptacle.

The operation of the mill is as follows:

The user, after having turned over the receptacle, holds the cover tight in his hand and causes the receptacle to rotate, (he could of course hold the receptacle and cause the cover to rotate); the condiment is then ground between teeth 16 of the receptacle and teeth 21 of the cover and flows in a pulverulent state through channels 17—19 and holes 20 of the cover.

Figure 4:
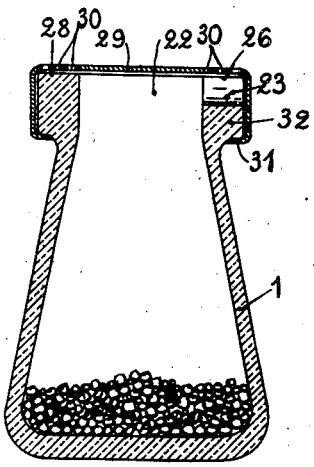
Fig. 4 shows in axial section another embodiment of my invention.
Figure 5:
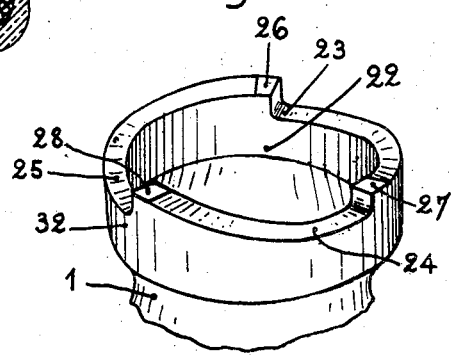
Fig. 5 shows in perspective view, on a larger scale, the edge limiting the opening of the receptacle of said embodiment.

The mill as shown in Figs. 4 and 5 is constituted by a receptacle 1 whose edge limiting the opening 22 constitutes the ascending gradients 23, 24, 25, separated by steps the top surfaces of which 26, 27, 28, are located in a plane at a right angle to the axis of the opening 22. Upon these surfaces bears a cover or lid 29 provided with holes 30 disposed in the form of a ring situated opposite the edge of the receptacle; the said cover, acting as a sieve, is rotatably maintained in contact with surfaces 26, 27, 28, in turning down its lower edge 31 under a projection 32 of the receptacle.

The operation of the said device is as follows:

The receptacle being turned over, the sieve down side, the particles of matter to be subdivided fill up the spaces limited by the gradients 23—25 and the sieve; the sieve being held stationary and the receptacle having a revolving motion imparted thereto in a suitable direction, the said particles are jammed between the gradients and the sieve, thereby causing their subdivision and their passing through the perforations of the sieve.

The said device is adapted to constitute a non-refillable packing for the matter to be subdivided and becomes useless after the latter has been exhausted.

Figure 6:
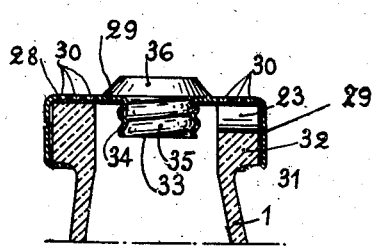
Fig. 6 shows in axial section a modified form of the cover or lid of said receptacle.
Figure 7:
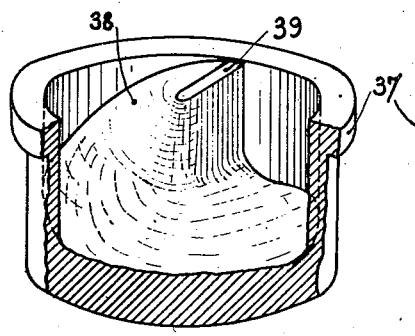
Figs. 7 and 8 show the receptacle of a third embodiment, in a perspective view, partly broken away and under different angles.
Figure 8:
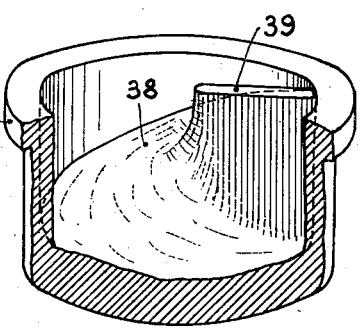
Figure 9:
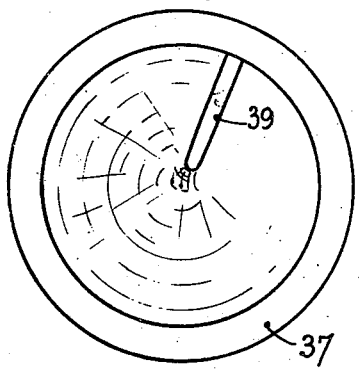
Fig. 9 is a plan view of same.

Fig. 6 shows a modified form in which an opening 33 is provided in the sieve; the inner wall of the said opening is provided with a screwthread 34 adapted to receive by screwing the corresponding part 35 of the stopper 36. The said arrangement allows of filling the receptacle after the matter contained therein has been exhausted.

The receptacle of the mill according to Figs. 7–11 is preferably made of glass or a plastic material capable of being moulded; the same comprises at its upper part a flange 37, whilst its bottom forms an helical rising gradient 38 ending at the top into a ridge 39 close to the opening of the receptacle. The said receptacle is closed (Figs. 10 and 11) by a perforated lid or cover 40 acting as a sieve, the edge of which has been turned down at 41, beneath the flange, so as to allow the same to turn freely relatively to the receptacle, a milled part or the like, not shown, provided on the side wall of the said lid making the holding of same more easy.

Figure 10:
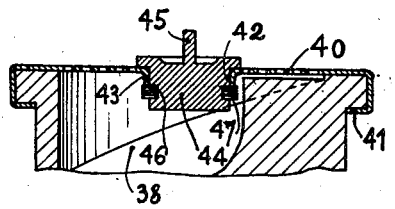
Figs. 10 and 11 are part sections on the upper part of said mill respectively provided with a lid with filling plug and a usual lid.
Figure 11:
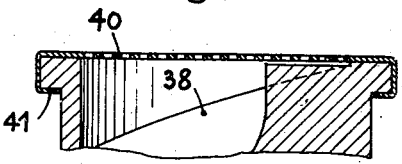

In Fig. 10, the lid is preferably provided near its middle portion with a port 42, the metal being upset so as to form a collar 43 parallel to the axis of the said port. A plug or stopper 44 with actuating lug 45 allows to shut up the said port;

the same comprises a groove 46 into which is inserted a resilient segment 47, made of india-rubber for example. It will be readily understood that, on the plug 44 being introduced, the segment 47 is pressed within the groove 46 and projects outwardly as soon as the same has passed the edge of collar 43, thereby securing the fastening of plug 44. It is only necessary to exert upon lug 45 a pull accompanied by a slight tilting motion for allowing to remove the plug or stopper.

Figure 12:
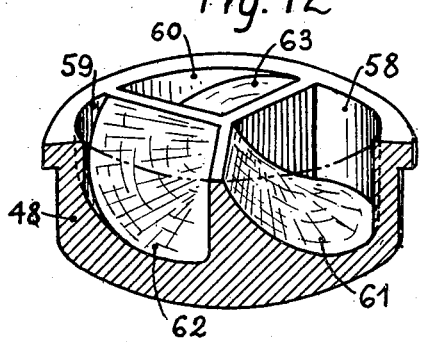
Fig. 12 shows a mill comprising three crushing gradients.

In Fig. 12, the bottom of the receptacle forms three cavities 58, 59, 60, everyone of which comprises a gradient 61, 62, 63, forming a crushing member, these three gradients being, of course, adapted to operate simultaneously, thereby increasing the efficiency of the apparatus. The lid or cover not shown acting as a sieve may eventually be provided with a filling port which it is only necessary to cause to correspond with everyone of the cavities for allowing the same to be filled.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A condiment mill, comprising an open container and a delivery cap over the container opening, said container being formed with an integral neck portion adjacent said opening, the top surface of said neck portion being shaped into gradients adapted to co-operate with said cap in crushing and delivering the condiment by a relative rotation of said container and cap, and seat surface elements between said gradients at the outer ends thereof and extending in one top plane, and means for rotatably holding said cap in seating engagement with said surface elements, thereby to provide operative engagement between said cap and said gradients.

2. A condiment mill, comprising an open container and a delivery cap over the container opening, said container being formed with an integral neck portion adjacent said opening, said neck portion having its top surface shaped into gradients adapted to cooperate with said cap in crushing and delivering the condiment by a relative rotation of said container and cap, and seat surface elements between said gradients at the outer ends thereof and extending in one end plane, said neck portion further being formed with an outer flange and said cap being formed with a corresponding inturned flange adapted to engage said neck portion flange, for rotatably connecting said cap to said container, in seating engagement with said surface elements, thereby to provide for an operative engagement between said cap and said gradients.

3. A condiment mill, comprising an open container and a delivery cap over the container opening, said container being formed with an integral neck portion adjacent said opening, said neck portion having its top surface shaped into gradients adapted to cooperate with said cap in crushing and delivering the condiment by a relative rotation of said container and cap, and seat surface elements between said gradients at the outer ends thereof and extending in one top plane, and means for rotatably holding said cap in seating engagement with said surface elements, thereby to provide for an operative engagement between said cap and gradients, said cap being provided with a central opening for refilling the container, and a removable stopper for said refilling opening.

JEAN MANTELET.